US012807157B2

(12) United States Patent
Thum et al.

(10) Patent No.: US 12,807,157 B2
(45) Date of Patent: Nov. 24, 2026

(54) OVERTAKING ASSISTANCE DEVICE AND METHOD FOR ASSISTING A COMMERCIAL VEHICLE DURING OVERTAKING ANOTHER VEHICLE

(71) Applicant: KNORR-BREMSE Systeme fuer Nutzfahrzeuge GmbH, Munich (DE)

(72) Inventors: Daniel Thum, Golling (AT); Valer Merza, Szentendre (HU); Jan Grebe, Munich (DE); Tamas Komlos, Csavoly (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 78 days.

(21) Appl. No.: 18/292,679

(22) PCT Filed: Jul. 22, 2022

(86) PCT No.: PCT/EP2022/070708
§ 371 (c)(1),
(2) Date: Jan. 26, 2024

(87) PCT Pub. No.: WO2023/006630
PCT Pub. Date: Feb. 2, 2023

(65) Prior Publication Data

US 2025/0083677 A1 Mar. 13, 2025

(30) Foreign Application Priority Data

Jul. 29, 2021 (EP) .................................... 21188608

(51) Int. Cl.
*B60W 30/18* (2012.01)
*G08G 1/16* (2006.01)

(52) U.S. Cl.
CPC . *B60W 30/18163* (2013.01); *B60W 2300/145* (2013.01); *B60W 2554/80* (2020.02)

(58) Field of Classification Search
CPC ..... B60W 30/18163; B60W 2300/145; B60W 2554/80; G08G 1/167
(Continued)

(56) References Cited

U.S. PATENT DOCUMENTS 9,211,889 B1 12/2015 Hoetzer et al.
9,959,762 B1 * 5/2018 Kim ..................... B60R 21/013
(Continued)

FOREIGN PATENT DOCUMENTS

CN 105518762 A 4/2016
CN 109353338 A 2/2019
(Continued)

OTHER PUBLICATIONS

International Search Report (PCT/ISA/210) issued in PCT Application No. PCT/EP2022/070708 dated Oct. 28, 2022 with English translation (3 pages).
(Continued)

*Primary Examiner* — Hossam M Abd El Latif
(74) *Attorney, Agent, or Firm* — Crowell & Moring LLP

(57) ABSTRACT

An overtaking assistance device for a commercial vehicle is disclosed. The commercial vehicle has at least one distance measurement device mounted on a rear side of the commercial vehicle. The distance measurement device is configured to provide distance information suitable to determine a closest distance and an angle to another vehicle in an adjacent driving lane. The distance measurement device has an evaluation unit configured to provide an overtaking support function by: accessing the distance measurement device to obtain the distance information to the other vehicle; determining a longitudinal distance between the commercial vehicle and the other vehicle based on the
(Continued)

distance information; and issuing a signal indicating a possible safe lane change to complete the overtaking operation.

15 Claims, 7 Drawing Sheets

(58) Field of Classification Search
USPC ............................................................... 701/1
See application file for complete search history.

(56) References Cited

U.S. PATENT DOCUMENTS

| | | | | |
|---|---|---|---|---|
| 10,850,737 | B2 * | 12/2020 | Kim | B60W 30/0956 |
| 12,012,102 | B2 * | 6/2024 | Al-Nuaimi | B60W 30/18163 |
| 2003/0025597 | A1 | 2/2003 | Schofield | |
| 2014/0085472 | A1 * | 3/2014 | Lu | B60R 1/26 348/148 |
| 2016/0129919 | A1 | 5/2016 | Kubo | |
| 2016/0185388 | A1 * | 6/2016 | Sim | G06V 20/58 701/41 |
| 2022/0319332 | A1 * | 10/2022 | Kawaguchi | G08G 1/167 |
| 2022/0363257 | A1 * | 11/2022 | Temel | B60W 10/04 |
| 2023/0391399 | A1 * | 12/2023 | Quilliard | B62D 15/029 |

FOREIGN PATENT DOCUMENTS

| | | | | |
|---|---|---|---|---|
| CN | 109878446 B * | 4/2021 | | |
| DE | 10 2005 013 669 A1 | 9/2006 | | |
| EP | 1 726 481 A1 | 11/2006 | | |
| WO | WO 2010/064963 A1 | 6/2010 | | |
| WO | WO-2020020525 A1 * | 1/2020 | | G08G 1/167 |
| WO | WO 2021/020022 A1 | 2/2021 | | |

OTHER PUBLICATIONS

Written Opinion (PCT/ISA/237) issued in PCT Application No. PCT/EP2022/070708 dated Oct. 28, 2022 (6 pages).
Extended European Search Report issued in European Application No. 21188608.0 dated Feb. 7, 2022 (8 pages).
European Office Action issued in European Application No. 21 188 608.0 dated Jan. 29, 2025 (7 pages).
Chinese-language Office Action issued in Chinese Application No. 202280053008.7 dated May 23, 2026 with partial English translation (19 pages).

* cited by examiner

OVERTAKING ASSISTANCE DEVICE AND METHOD FOR ASSISTING A COMMERCIAL VEHICLE DURING OVERTAKING ANOTHER VEHICLE

BACKGROUND AND SUMMARY

The present invention relates to an overtaking assistance device and method for assisting overtaking of another vehicle and, in particular, to a method to support a driver during overtaking another vehicle.

When a driver of a long vehicle or a vehicle combination overtakes another vehicle, it is hard to distinguish if the driver has fully passed the other vehicle with his/her vehicle or vehicle combination to safely return to the original driving lane. In case a driver returns to the original lane without the other vehicle passed it can lead to abrupt and dangerous driving maneuvers of the participating vehicles up to a crash.

In conventional commercial vehicles, there is no system supporting the driver in overtaking other vehicles. The overtaking maneuvers are performed only according to the experience of the driver.

Therefore, there is a demand for a device that is able to assist the driver or a driving unit during overtaking another vehicle and coming back to the original lane.

At least some of the problems of the conventional device as described before are overcome by a device, an electronic control unit, a vehicle, and a method, in accordance with the independent claims. The dependent claims refer to further advantageous realizations of the subject matter of the independent claims.

The present invention relates to an overtaking assistance device for a commercial vehicle. The commercial vehicle comprises at least one distance measurement device mounted on the rear of the commercial vehicle. The distance measurement device is configured to provide distance information suitable to determine a closest distance and an angle to the other vehicle in an adjacent driving lane. The overtaking assistance device comprises an evaluation unit that is configured to provide an overtaking support function by accessing the distance measurement device to obtain, based on the measured distance and/or the angle, distance information to the other vehicle. The evaluation unit is further configured to determine a longitudinal distance Y between the commercial vehicle and the other vehicle based on the distance information and to issue a signal indicating a possible safe lane change to complete the overtaking operation.

The distance information may include a closest distance R to the other vehicle and an angle $\alpha$ defined as an angle between the rear side of the vehicle and the line of the closest distance R. It is understood that the distance measurement device may be mounted at any position at the rear (as long as it can capture the area behind the vehicle) and may be spaced away from a corner portion (e.g. located in the middle of the vehicle or a trailer). Thus, the distance measurement device may cover only a region behind the vehicle, but not a region besides the vehicle (only in a lateral direction).

The longitudinal distance Y is a distance between the rear side of the vehicle and a front side of the other vehicle measured along the road (which may define the longitudinal direction). A lateral distance X would be measured perpendicular hereto. Having the closest distance R to a point at the front side of the other vehicle and the angle $\alpha$, the longitudinal distance Y can be calculated by: $R \times \sin \alpha = Y$. Accordingly, the lateral distance X can be calculated as $R \times \cos \alpha = X$. The longitudinal distance Y is positive when there is a longitudinal gap between the commercial vehicle and the other vehicle; and it is negative when there is a longitudinal overlap between the commercial vehicle and the other vehicle.

According to embodiments, the evaluation unit is configured to compensate any offset in the position of the distance measurement device (e.g. from a center line of the vehicle) in the lateral distance X and/or longitudinal distance Y. The corresponding information about the position may be stored in the distance measurement device or in the evaluation unit or may be obtained from any storage device in the vehicle. Therefore, optionally, the evaluation unit is further configured to determine a compensation for an offset of a position of the distance measurement device from a reference position (e.g. on the middle/center line or on a corner of the vehicle).

Optionally, the evaluation unit is configured to be placed in an idle state and an activated state. The overtaking support function may be provided (e.g. only) in the activated state which is triggered by at least one of the following events: an activated turning indicator, an initiated or upcoming steering actuation e.g. by a driver or a driving unit, a lateral approaching object which may or may not indicate a lane change. The driving unit may, e.g., implement a highly automated driving (HAD). Therefore, a driver may or may not be present in the vehicle during driving. The driving unit may control the overtaking operation without any input from the driver (which may act only as a supervisor). The initiated or upcoming steering actuation can be sensed by corresponding sensors (e.g. detecting a steering angle) or may correspond to a starting of a corresponding overtaking subroutine in the driving unit that controls the overtaking operation.

Optionally, the evaluation unit is further configured to determine at least one of the following: a lateral distance X, a relative speed (e.g. relative to the other vehicle), a relative acceleration (e.g. relative to the other vehicle) between the commercial vehicle and the other vehicle, an activated indicator, the angle $\alpha$ of object reflections (e.g. to a front edge of the other vehicle), which are each measured between the commercial vehicle and the other vehicle (e.g. to a front edge of the other vehicle). The lateral direction may be perpendicular to the longitudinal direction and the lateral distance X may by the distance between a (visible) side of the other vehicle and a middle line of the vehicle when measured along the lateral direction.

Optionally, the evaluation unit is further configured to calculate, based on the longitudinal distance Y and the relative speed, a time to collision, TTC, and to issue a first signal to the driver and/or to the driver unit in case the time of collision is below a predefined threshold (e.g. 5 seconds, 10 seconds or more).

Optionally, the evaluation unit is further configured to issue a second signal to the driver and/or to the driver unit in case the determined lateral distance X is outside a predefined range (e.g. less than the lane width minus half the width of the commercial vehicle).

Optionally, the evaluation unit is further configured to issue a third signal to the driver and/or to the driver unit in case the determined longitudinal distance Y is outside a predefined range or below an upper threshold (e.g. a legal minimum of safety distance which may correspond to the speed of traveling such as 50 meters longitudinal distance for speed of 50 km/h).

Optionally, the evaluation unit is configured to trigger an activation of at least one of the following: an acoustic signal, a blinking end-outline marker, a visual indicator in a cabin or at the vehicle visible through the side window or side mirrors for the driver, a warning to other systems such as the driving unit or the dashboard. For example, the issued signal(s) by the evaluation unit may cause these subsequent warning signals.

Optionally, the commercial vehicle further comprises at least one (further) sensor mounted on a side of the vehicle that may be configured to detect the other vehicle at the side of the vehicle (when the vehicle and the other vehicle at least partially overlap). The evaluation unit is further configured to receive a detection signal of the sensor as a confirmation of a presence of the other vehicle.

Optionally, the evaluation unit is in communication with the measurement device, a braking control unit, a light control unit, and other vehicle control units, or may be accommodated therein.

Therefore, the present invention relates also to an electronic control unit (ECU) comprising the above described overtaking assistance device, wherein the electronic control unit is designated to control a function of the commercial vehicle other than a reverse assistance.

Optionally, the electronic control unit may be one of the following: a brake control unit, a light control unit, a vehicle electronic control unit, a data processing unit in the distance measurement device. The overtaking assistance device may thus be implemented in the distance measurement device.

The present invention further relates to a commercial vehicle comprising a distance measurement system and a device as described before for providing an overtaking function to assist a commercial vehicle's driver and/or a driving unit. The commercial vehicle may comprise the electronic control unit as described before.

Optionally, the commercial vehicle comprises a tractor and a trailer, and the distance measurement device is mounted on the rear of the trailer. The distance measurement device may comprise at least one of: a Lidar, at least one Radar unit, and a stereo camera. In particular, the distance measurement device is configured to measure not only the closest distance but also to enable the determination of the angle between the rear side of the commercial vehicle and the line if the closest distance. Hence, the exemplary Radar unit may include multiple transmitters and receivers (or corresponding antennas) to enable an angular resolution for the received signals.

The present invention relates further to a method for assisting a commercial vehicle or its driver when overtaking another vehicle. The method comprises: obtaining distance information to the other vehicle from a distance measurement device; determining the longitudinal distance Y between the commercial vehicle and the other vehicle based on the distance information and issuing a signal indicating a possible safe lane change to complete the overtaking operation. The step of obtaining may include an accessing the distance measurement device and retrieving the information, or it may include a transmitting the distance information from the distance measurement device, e.g. via a vehicle bus, which may be caused by the distance measurement device itself.

The present invention further relates to a computer readable storage device having software instructions stored thereon, designed to carry out, when executed on a data processor, the method for assisting a commercial vehicle when overtaking another vehicle. Thus, the method may also be implemented in software or a computer program product.

Embodiments of the present invention can, in particular, be implemented in an electric control unit ECU, or by software or as a software module in an ECU. Therefore, embodiments relate also to a computer program having a program code for performing the method, when the computer program is executed on a processor.

Some examples of the devices and/or methods will be described in the following by way of examples only, and with respect to the accompanying figures, in which:

DETAILED DESCRIPTION OF THE DRAWINGS

Figure 1:
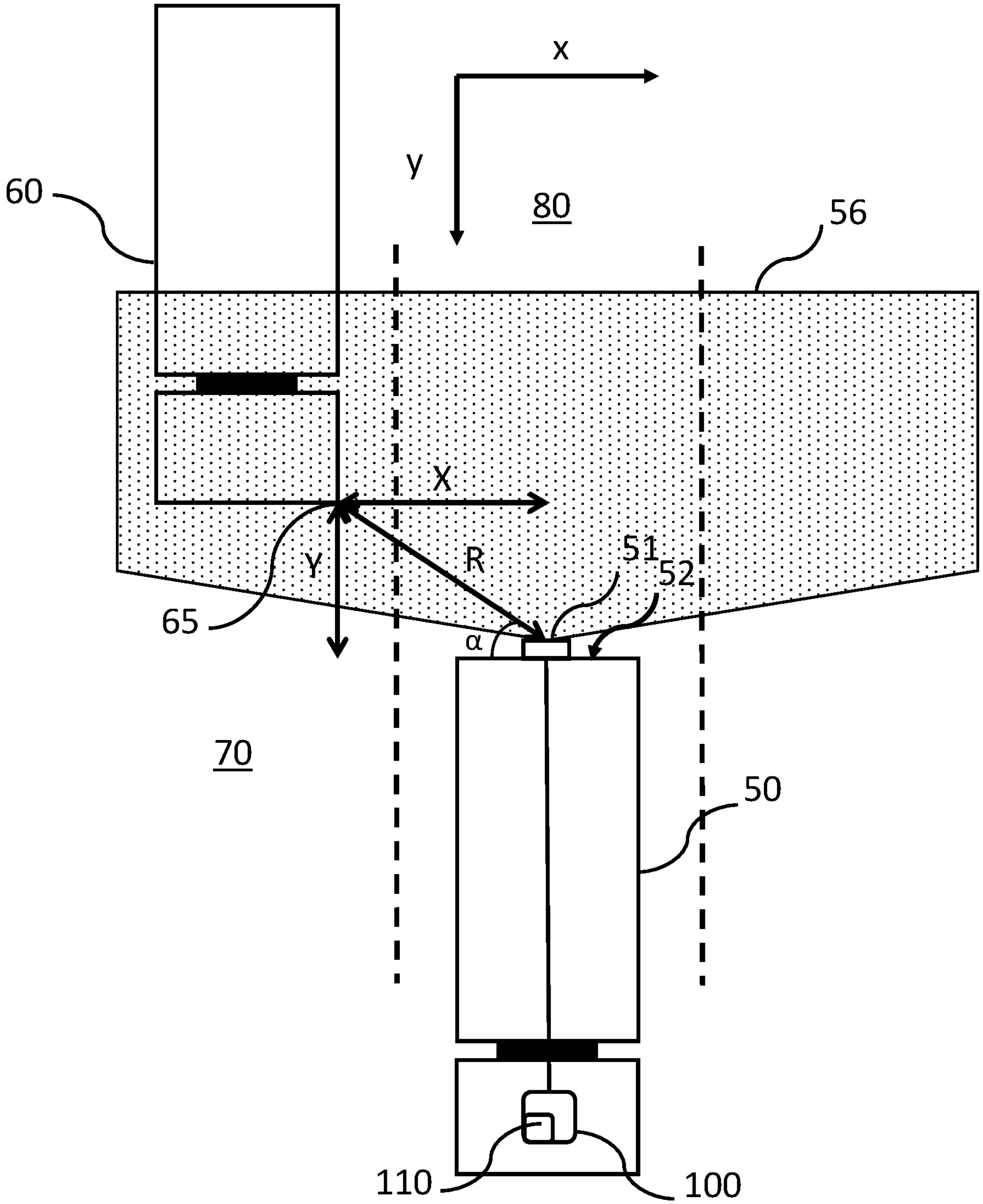
FIG. 1 illustrates an overtaking assistance device for a commercial vehicle according to an embodiment of the present invention.

FIG. 1 depicts an overtaking assistance device 100 for a commercial vehicle 50 in a driving lane 80. The commercial vehicle 50 comprises at least one distance measurement device 51 mounted on a rear side 52 of the commercial vehicle 50. The distance measurement device 51 is configured to provide distance information that enable a determination of a closest distance R and the angle $\alpha$ to another vehicle 60 in an adjacent driving line 70 within its coverage area 56 (drawn as patterned region). The overtaking assistance device 100 comprises an evaluation unit 110, which may provide an overtaking support function by obtaining the distance information from the distance measurement device 51. The other vehicle 60, may be another commercial vehicle or any other vehicle type.

In the following, the longitudinal direction y is defined as a forward direction of the commercial vehicle movement on the road and the lateral direction x is perpendicular to the longitudinal direction y.

The distance measurement device 51 may comprise a Lidar and/or at least one Radar unit and/or a stereo camera. The distance measurement device 51 may provide information only from the back of the commercial vehicle 50 as schematically shown in pattern fulfillment area 56 representing the coverage area. The distance measurement device 51 may be mounted on the rear side 52 of the commercial vehicle 50 away from the corners, e.g. mounted in a central region of the rear side 52 of the commercial vehicle 50.

An optional object recognition may be performed to decide that the distance R is actually measured to a front corner 65 of the other vehicle 60. The object recognition may generate a shape of the other vehicle 60 in the coverage area 56. If the closest point of the other vehicle 60 (corresponding to the closest distance R) is strictly within the generated shape (i.e. inside its contour), the measured distance R should point to the front corner 65 of the other vehicle 60. Otherwise, the front corner 65 may be outside the coverage area 56 and further considerations are needed (see below).

When using a Radar or Lidar, the distance measurement device 51 may emit a waveform and receive a reflected echo to estimate the geometry. The distance measurement device 51, may use a frequency modulated continuous wave or a pulsed wave to measure a range, an azimuth, an elevation and a velocity of any object (here the other vehicle 60). The echo signals may be mapped to a point cloud indicating at least part of a shape of detected object. The detected objects may be steady objects (e.g. reflector posts and trees), but also moving objects (e.g. other vehicles 60), which will be identified by the distance measurement device 51 or the evaluation unit 110.

The at least one Radar unit may be configured to provide, besides the ranging, an angular resolution. For this, the radar unit may include one of the following: MIMO radar, phased array radar, multiple antennas (for sending and/or receiving). Similarly, the stereo camera is able to detect an object with respect to its 3-dimensional position including the azimuth angle and the distance (depth information) from the rear side 52 of the vehicle 50 to the other vehicle 60.

The evaluation unit 110 is in connection and communication with the measurement device 51, wherein this connection may be a via direct-wired connection, a wireless connection, or via a controller area network (CAN) bus of the vehicle. The evaluation unit 110 may determine a longitudinal distance Y based on the distance information received from the distance measurement device 51 by using the definition:

$$Y = R \times \sin\alpha, \tag{1}$$

wherein R is the closest distance of the distance measurement device 51 to the other vehicle 60 and α in the enclosed angle (see FIG. 1). Thus, the longitudinal distance Y is defined as the distance in y-direction between the front side of the other vehicle 60 as a starting point and the distance measurement device 51 at the back of the commercial vehicle 50 as the ending point.

The overtaking support function provided by the evaluation unit 110 may further determine the lateral distance X, and the relative velocity or acceleration between the commercial vehicle 50 and the other vehicle, and, optionally, a time to collision.

The evaluation unit 110 may determine the lateral distance X based on the distance information received from the distance measurement device 51 as $$X = R \times \cos\alpha. \tag{2}$$

If the distance measurement device 51 is mounted in the central region (in the lateral direction x) of the rear side 52, the lateral distance X is defined as the distance in the x-direction between the side of the vehicle 60 as shown in FIG. 1 and the centerline of the commercial vehicle 50. The lateral distance X between commercial vehicle 50 and the other vehicle 60 shall not be (much) less than the standard highway lane width minus half of the vehicle's width. Similarly, the lateral distance X shall not exceed the standard highway lane width plus half of the commercial vehicle's width. If this happens, warning signals may be issued.

It is understood, in the calculation of the lateral and longitudinal distances X, Y, the evaluation unit 110 may take into account a possible rounded front edge of the other vehicle and/or the exact placement of the distance measurement device 51 to obtain reliable values or to avoid errors in the calculations. In addition, the evaluation unit 110 may be able to compensate any offset in the position of the distance measurement device 51 (e.g. from a middle line of the vehicle 50) when the lateral distance X and/or longitudinal distance Y is determined. The corresponding information about the position may be stored in the distance measurement device 51 or in the evaluation unit 110 or may be obtained from any storage device in the vehicle 50. It is understood that the position of the distance measurement device 51 can be arbitrary, i.e. the offset may relate to any spatial direction. According to embodiments, this information is known and will be taken into account when determining the lateral and longitudinal distances X, Y. The offset will be compensated.

The overtaking function does not need to be permanently active. Instead, the evaluation unit 110 can be switched between an idle state and activated state. The activated state can be triggered by various events such as an activated turning indicator, an initiated or upcoming steering actuation. The events can be caused by the driver and/or the driving unit. When the evaluation unit 110 is in the activated state, it may automatically provide the overtaking support function.

Figure 2:
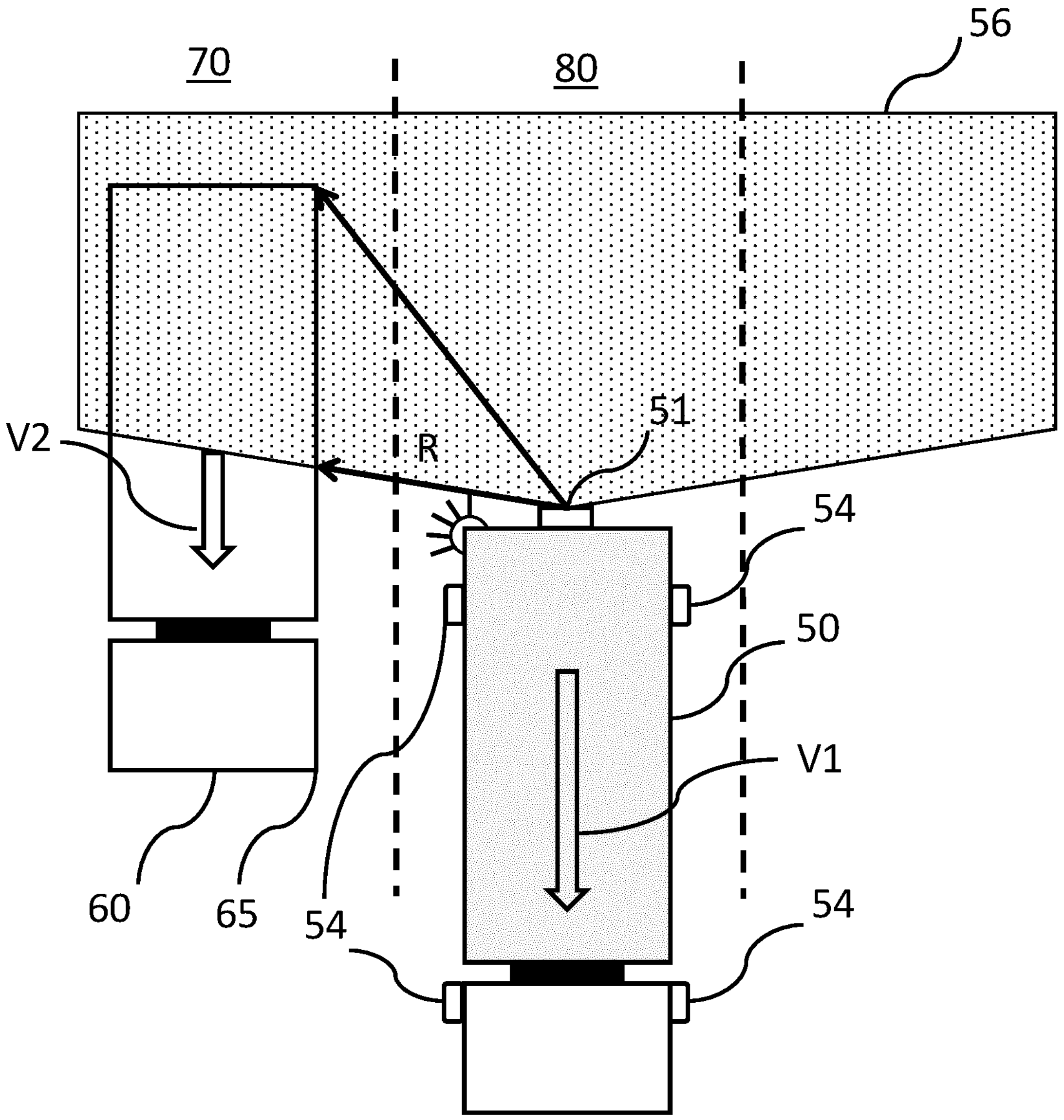
FIG. 2 depicts a commercial vehicle overtaking another vehicle in an adjacent lane.

FIG. 2 depicts an exemplary situation where the commercial vehicle 50 overtakes the other vehicle 60 in the adjacent lane 70 and the overtaking operation is not yet completed. In this scenario, the relative speed is: $V1-V2>0$ indicating a progressive overtaking operation. The longitudinal distance Y would actually be negative indicating a partial overlap of both vehicles. However, since the distance measurement device 51 cannot yet capture the front side (or the corresponding front corner or edge 65) of the other vehicle 60, it cannot yet determine the longitudinal distance Y.

According to embodiments, the evaluation unit 110 may determine the front corner 65 and/or the speed of the other vehicle 60 as follows. When the overtaking maneuver is initiated and the commercial vehicle 50 is faster than the other vehicle 60 (i.e. $V1>V2$), the distance measurement device 51 will eventually detect the back portion of the other vehicle 60 on the adjacent lane 70. In this situation, the closest distance R will be on the edge of the coverage area 56 (see FIG. 2). From this fact, the evaluation unit 110 will infer that the front corner 65 has not been detected yet and thus at least a portion of the other vehicle 60 is expected to be beside the commercial vehicle 50. Therefore, the signal indicating a possible safe lane change cannot yet be issued, because the overtaking maneuver cannot yet be complete.

If the overtaking maneuver proceeds, eventually, the situation as shown in FIG. 1 (or FIG. 3 below) will occur. In this case, the closest distance R measured by the distance measurement device 51 is not on the edge of the coverage area 56, but points to an interior point of the coverage area 56. Possible reflections detected at the edge of the coverage area 56 will indicate a larger distance than the measured distance R to the front corner 65 as shown in FIG. 1. According to embodiments, the evaluation unit 110 will infer from this situation that the front corner 65 has been detected.

According to further embodiments, the evaluation unit 110 may also find that the front corner 65 has not yet been detected if the distance measurement device 51 measures for the shortest distance R and the angle α constant values (or values within a predetermined range).

Embodiments may also consider a gap between a trailer and the tractor of the other vehicle 60, e.g., by starting with the calculation of the longitudinal distance Y only after a predetermined time after having detected a candidate of the front edge (e.g. at least 2 s or 5 s or another value). Another way to take into account the gap would be to consider as candidate of the front corner 65 only points that are sufficiently away from the edge of the coverage area 56 (e.g. larger than a predetermined minimum angular value).

According to further embodiments, at least one (further) sensor 54 may be present at a side of the vehicle 50 (e.g. at a side of the trailer or at the mirror of the tractor). This sensor device(s) 54 may be one of the following: another radar unit, an ultrasonic device, a camera, a lidar and may be configured to cover the (complete) side of the vehicle 50 to detect an object present at the lateral side (e.g. not behind the vehicle). This sensor 54 may be part of a turning assistance device. The evaluation unit 110 may thus be configured to use sensor data of the sensor device(s) 54 to confirm the presence of the other vehicle 60 at the side. In other words, the evaluation unit 110 has an additional way to decide whether or not both vehicles 50, 60 at least partially overlap. This result may be used as a confirmation or as a replacement of the above-described procedure to detect the front corner 65. For example, as long as the sensor device(s) 54 detect(s) an object on the side of the commercial vehicle 50 (as in FIG. 2), the front corner 65 cannot yet be present in the coverage area 56 of the distance measurement device 51.

Figure 3:
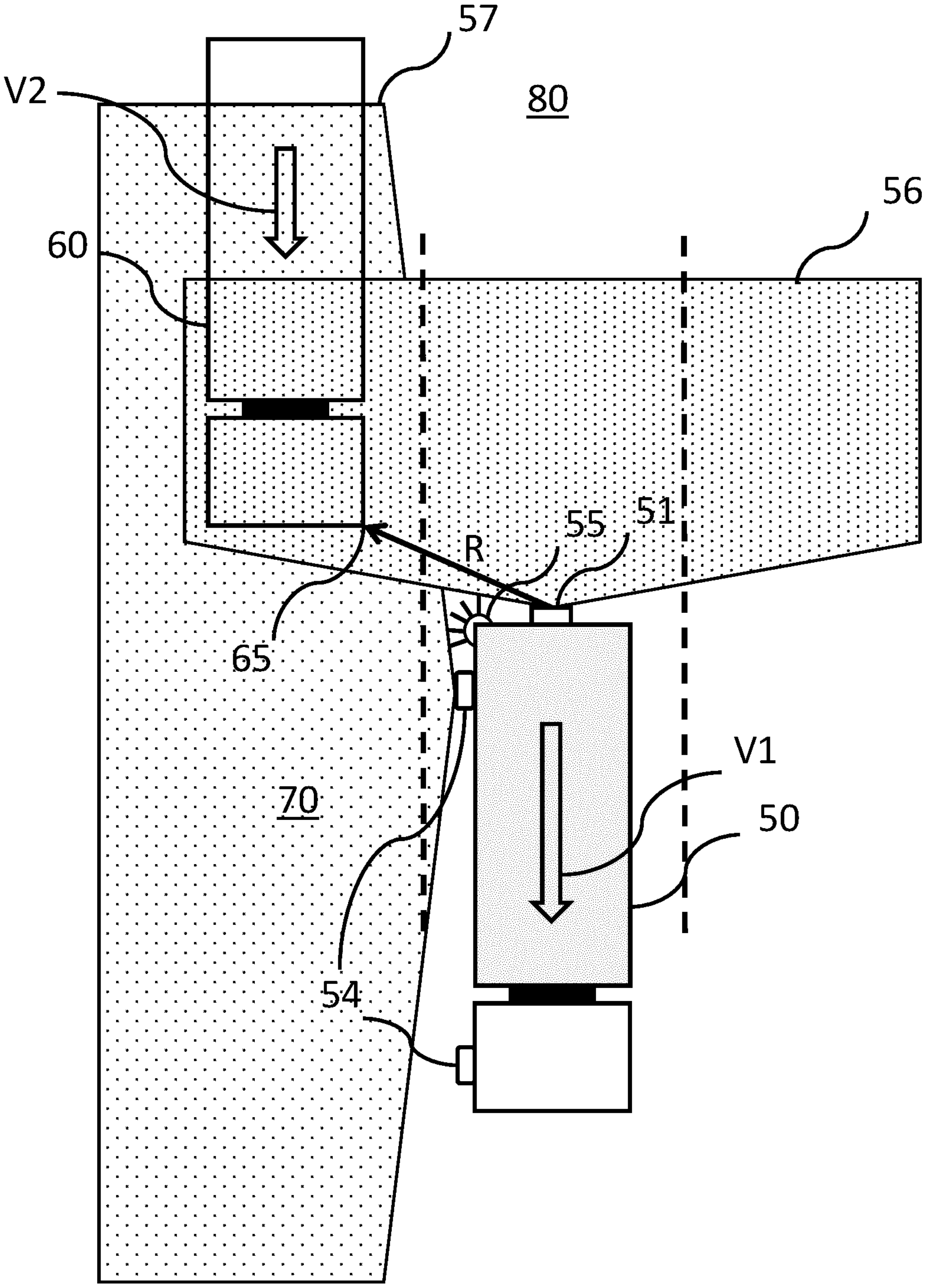
FIG. 3 illustrates the completion of an overtaking operation according to embodiments.

FIG. 3 depicts an exemplary situation where the commercial vehicle 50 in lane 80 completes the overtaking operation of the other vehicle 60. In this situation, the distance measurement device 51 is able to detect objects and to measure the closest distance R inside the coverage area 56. In other words, there is an angular gap between the line of closest distance R and the edge of the coverage area 56.

This situation can also be detected by an optional object recognition, wherein a shape of the other vehicle 60 in the coverage area 56 may be generated. When a front portion of the generated shape will be strictly within the coverage area 56, the evaluation unit 110 can infer that the measured closest distance R is pointing to the front corner 65 of the other vehicle 60.

As consequence of this detection, the longitudinal distance Y may be calculated according to equation (1). When the longitudinal distance Y is greater than a predefined threshold, the evaluation unit 110 will issue the signal to the driver and/or to the driving unit indicating a possible safe lane change from lane 80 to the adjacent lane 70 to finish the overtaking procedure.

According to further embodiments, the other vehicle 60 may still be monitored by the sensor 54, because its coverage area 55 partly overlap the coverage area 56 of the distance measurement unit 51, which is strictly behind the commercial vehicle 50. The coverage area 55 of the sensor(s) 54 is besides the commercial vehicle 50 and, in addition, extends also behind the commercial vehicle, but only in the adjacent lane 70.

In the situation shown in FIG. 3, the sensor 54 may also hand over the monitoring of the other vehicle 60 to the distance measurement device 51, which now can obtain all relevant information to complete the overtaking procedure. For example, after having detected the front corner 65, the sensor(s) 54 could send a verification signal to the evaluation unit 110 indicating the absence of vehicle 60 on the area strictly beside the commercial vehicle 50.

After having detected the front corner 65 of the other vehicle 60, the evaluation unit 110 can repeatedly calculate the longitudinal distance Y. If the evaluation unit 110 has determined that the longitudinal distance Y is large enough the signal is issued to driver and/or driving unit indicating the safe state for a lane changing.

It is understood that in the absence of the signal it may be unsafe for a lane change. The safe longitudinal distance Y can be any positive longitudinal distance greater than a threshold. This threshold can be dynamically calculated based on the speed of the vehicle 60. For instance, a legal minimum of safety distance may correspond to the speed of traveling such as 50 meters longitudinal distance for speed of 50 km/h. Therefore, whenever the calculated longitudinal distance Y exceeds this threshold, the evaluation unit 110 may issue the signal indicating a possible safe lane change. The dynamic calculation may be implemented as a real-time calculation.

On the other hand, according to further embodiments, at any time of the overtaking procedure, when the calculated longitudinal distance Y is less than the threshold, the evaluation unit 110 may send a warning signal to the driver and/or to driving unit indicating that it is not safe to change the lane.

The driver or the driving unit may activate an indicator light before or after the evaluation unit 110 has issued the signal. If the indicator light was activated before reaching the safe state, a warning may be issued to alert the driver/driving unit about the danger. After finishing a safe overtaking procedure, the evaluation unit may automatically go back to the idle state.

Figure 4:
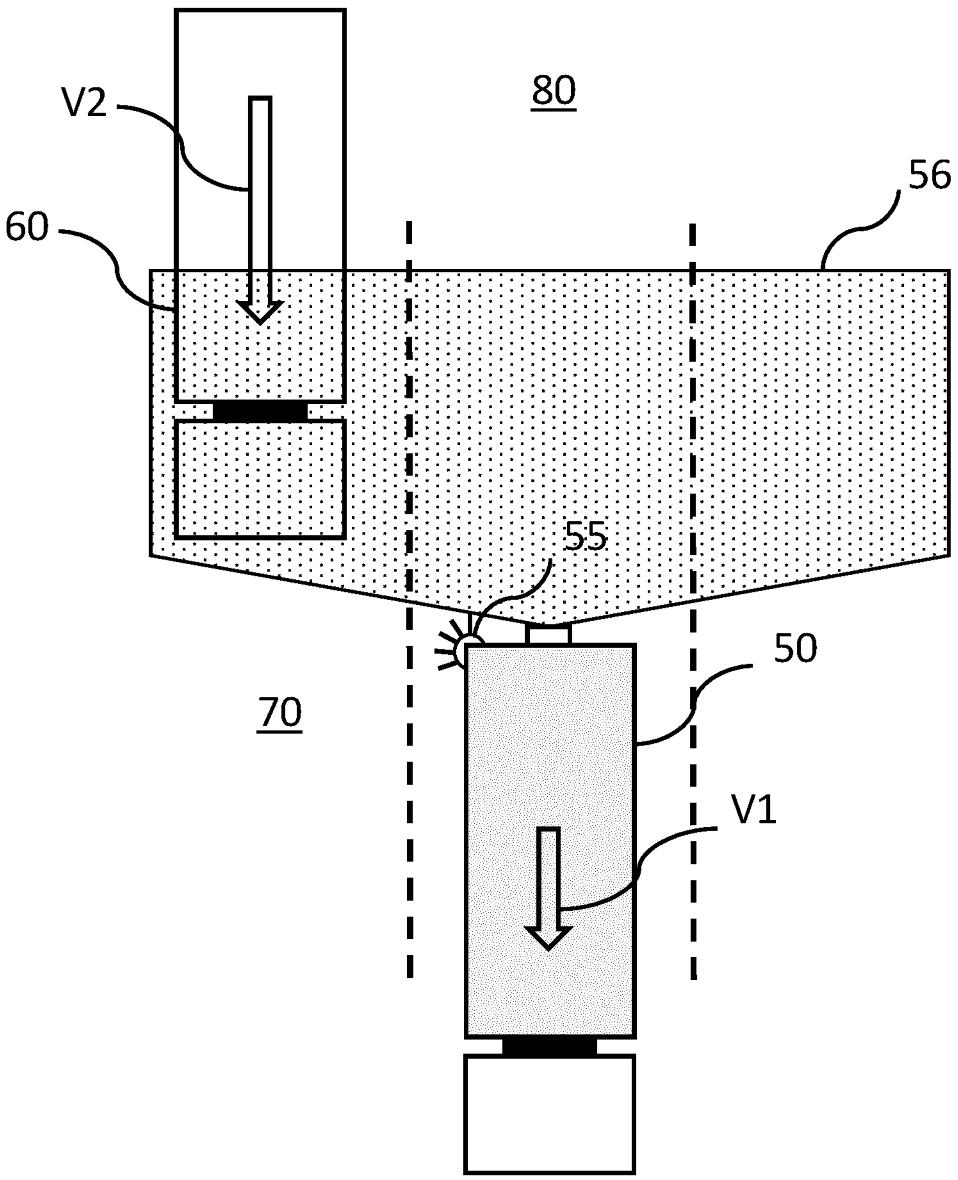
FIG. 4 depicts a commercial vehicle being approached by another vehicle from behind.

FIG. 4 depicts an exemplary situation where the speed V1 of the commercial vehicle 50 is lower than the speed V2 of the other vehicle 60 in an adjacent lane 70. For example, the commercial vehicle 50 may have reduced its velocity due to braking, or the other vehicle 60 accelerates. Another possible scenario where this may happen is when the vehicle 50 does wish to overtake the other vehicle 60, but the other vehicle 60 approaches from behind without being noticed by the vehicle 50.

In such situations, a lane change may possibly result in a collision of both vehicles 50, 60. To avoid such critical situation, after having detected the other vehicle 60 by the distance measurement device 51, the evaluation unit 110 can further determine at least one of the following: a relative speed or a relative acceleration between the commercial vehicle 50 and the other vehicle 60, and, based thereon, a time to collision TTC. When the other vehicle 60 is faster, the time to collision TTC can be defined as a time duration from the current time and a possible collision time in future if no actions are taken and can be calculated by:

$$TTC = \frac{Y}{V2 - V1} \tag{3}$$

wherein V1 is the speed of the commercial vehicle 50, V2 is the speed of the other vehicle 60 and Y is the determined longitudinal distance calculated according to formula (1). This calculation may be carried out for any detected vehicle, but only if the calculated TTC is positive, i.e. if V2>V1, the evaluation unit 110 may issue a signal to the driver and/or to the driving unit accordingly. The issued signal may thus indicate a safe lane changing if the TTC is greater than a predefined threshold. If the TTC is below a predefined threshold, the evaluation unit 110 may issue a warning signal to the driver and/or to the driving unit indicating a possible danger for the intended lane change.

Therefore, the overtaking support function may define one or more thresholds for: the lateral distance X, the longitudinal distance Y, and the time to collision, the relative velocity, the relative acceleration between vehicle 60 and the commercial vehicle 50 or any combination thereof. The thresholds may define a safe state or when exceeded from below or from above may indicate a potential critical state. The signals issued by the overtaking function indicate thus in particular a safe status for lane changing. For example, the evaluating unit 110 may issue a signal indicating the safety status of lane changing to the driver and/or driving unit, based on the lateral distance X compared to a predefined range, i.e. the lateral distance is not below a lower threshold and not above an upper threshold.

It is understood that an absence of a safe state may indicate a potentially critical state. Hence, the issued (safety) signal shall be equivalent to an inverted warning signal. Embodiments shall likewise include such warning signals instead or in addition of a positive signal indicating the safe state. An advantage of issuing a signal indicating a safe state instead of a warning signal relates to the fact, that this setup increases safety, because a faulty light, for example, cannot be interpreted as a safe state.

The issued (warning) signal(s) by the evaluation unit 110 may trigger at least one or any combination of the following: an acoustic signal, a blinking end outline marker, a visual indicator in a cabin, an (electric) transmission of a warning to other systems e.g. a driving unit, or dashboard.

According to further embodiments, the evaluation unit 110 may receive vehicle data such as direction and speed of movement from another vehicle control unit. Since the evaluation unit 110 may determine the speed of the vehicle 50 based on the sensor data of the distance measurement device 51, these addition vehicle data can be used for calibration of the distance measurement device 51 or may provide a redundancy. For example, the distance measurement device 51 or the evaluation unit 110 may calculate the relative speed between the commercial vehicle 50 and other vehicle 60 by repeating the measurements or by measuring a Doppler shift in the reflected signal. These results may be compared with the vehicle data as crosscheck for correctness or as a calibration.

Figure 5:
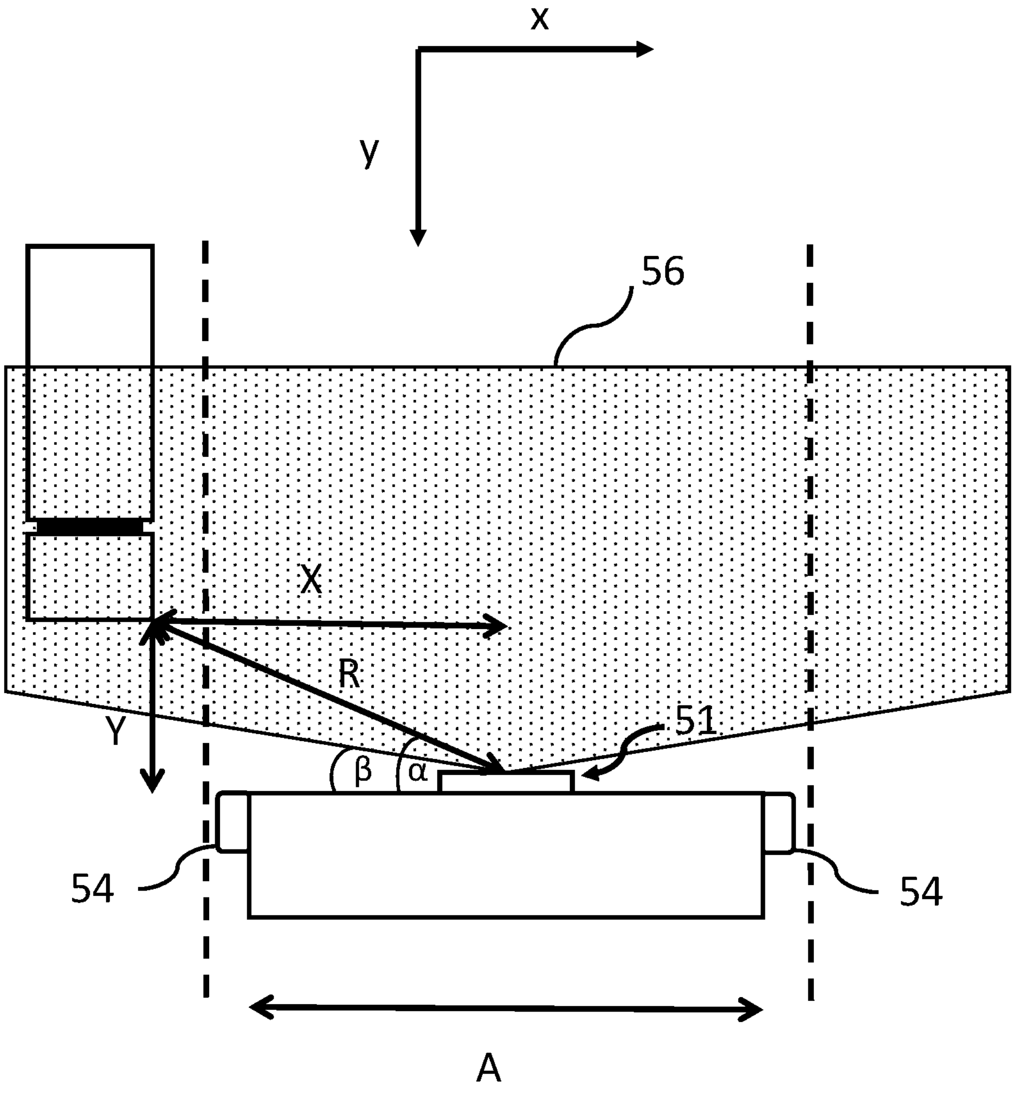
FIG. 5 illustrates further details of a commercial vehicle overtaking another vehicle.

FIG. 5 illustrates further details of the measurement using the distance measurement device 51 mounted on the rear side 52 of the commercial vehicle 50. In general, the distance measurement device 51 is configured to detect any objects (such as the other vehicle 60) only in the back of the commercial vehicle 50 and measures the object's distance information R and the angle $\alpha$ as shown in FIG. 5. The distance R represents again the closest distance to the object and the angle $\alpha$ is the respective angle relative the back side of the commercial vehicle 50.

The distance measurement device 51 may detect objects falling completely or partially in its coverage area 56, which has opening angle of $180°-2*\beta$ (see FIG. 5). For the angle $\alpha$ of the closest distance R it holds: $90>\alpha\geq\beta$. The angle $\alpha$ takes it minimum value when the other vehicle 60 is not fully in the coverage area 56 (i.e. the closest distance R is on the edge of the coverage area 56).

FIG. 5 shows further the sensors 54 mounted on the side of the commercial vehicle 50. The sensors 54 may have a view range of the side of the vehicle 50. Additionally or alternatively, the sensors 54 may have a partial view range of the back of the commercial vehicle 50 but not strictly behind the commercial vehicle 50 (as shown in FIG. 3 as overlapping between area 56 and area 55).

According to further embodiments (not shown in this figure), the commercial vehicle 50 may also overtake more than one other vehicle 60. In this scenario, the sensors 54 may send information regarding the presence of further vehicles in the adjacent lane 70. The evaluation unit 110 may receive the additional information from sensors 54 to evaluate and issue a signal indicating the safety status of the overtaking operation involving more than one other vehicle. For example, the longitudinal distance Y between the commercial vehicle 50 and a first other vehicle may be greater than a predefined threshold, but a second other vehicle may be in adjacent line 70 partially or fully beside the commercial vehicle 50. In this situation, the sensor(s) 54 may send a signal to the evaluation unit 110 indicating the presence of the second other vehicle beside the commercial vehicle 50. Therefore, the evaluation unit 110 may infer from this situation that no safe state is yet achieved and thus may not yet issue the signal to the driver and/or the driving unit, because the lane change would be unsafe.

Figure 6:
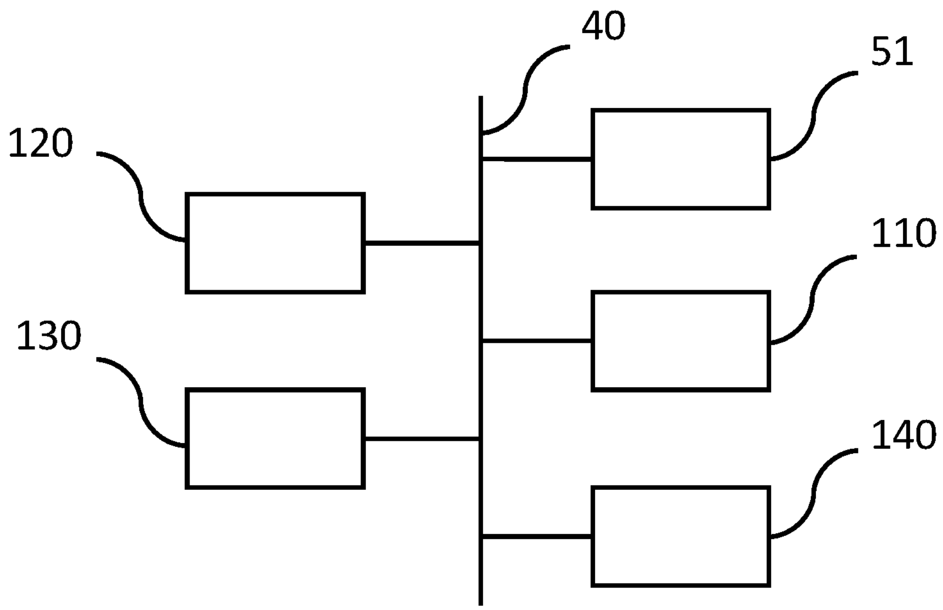
FIG. 6 depicts a schematic communication through a bus between different units in a commercial vehicle.

FIG. 6 depicts a schematic diagram of different units of a commercial vehicle 50 connected to each other via a communications system such as ethernet or a CAN bus 40. The commercial vehicle 50 may comprise various control units such as a vehicle control unit 140 or a central control unit, a light control unit 130 to control the light indicators, a brake control unit 120, and a control unit integrated in the distance measurement device 51. The evaluation unit 110 can be in communication with all these control units via the CAN bus 40 and/or via wireless or via any radio communication.

However, according to embodiments, the evaluation unit 110 may be integrated in one these control units, i.e. in the distance measurement unit 51 or in the braking unit 120, or in the light control unit 130 or in the central unit 140. In particular, integration may mean that no additional component has to be added to the vehicle. In other words, after integration of the evaluation unit 110 into a given control unit, both components cannot be separated from each other. For example, all functions of the evaluation unit 110 can be implemented into the given control unit by installing respective software.

Therefore, embodiments relate also to an electronic control unit, ECU, including the overtaking assistance device 100. The electronic control unit ECU is then configured to control a function of the commercial vehicle 50 and, in addition, the overtaking assistance. For example, if the overtaking assistance device 100 is integrated into the brake control unit 120, it will control the vehicle braking as well as provides the overtaking function.

Figure 7:
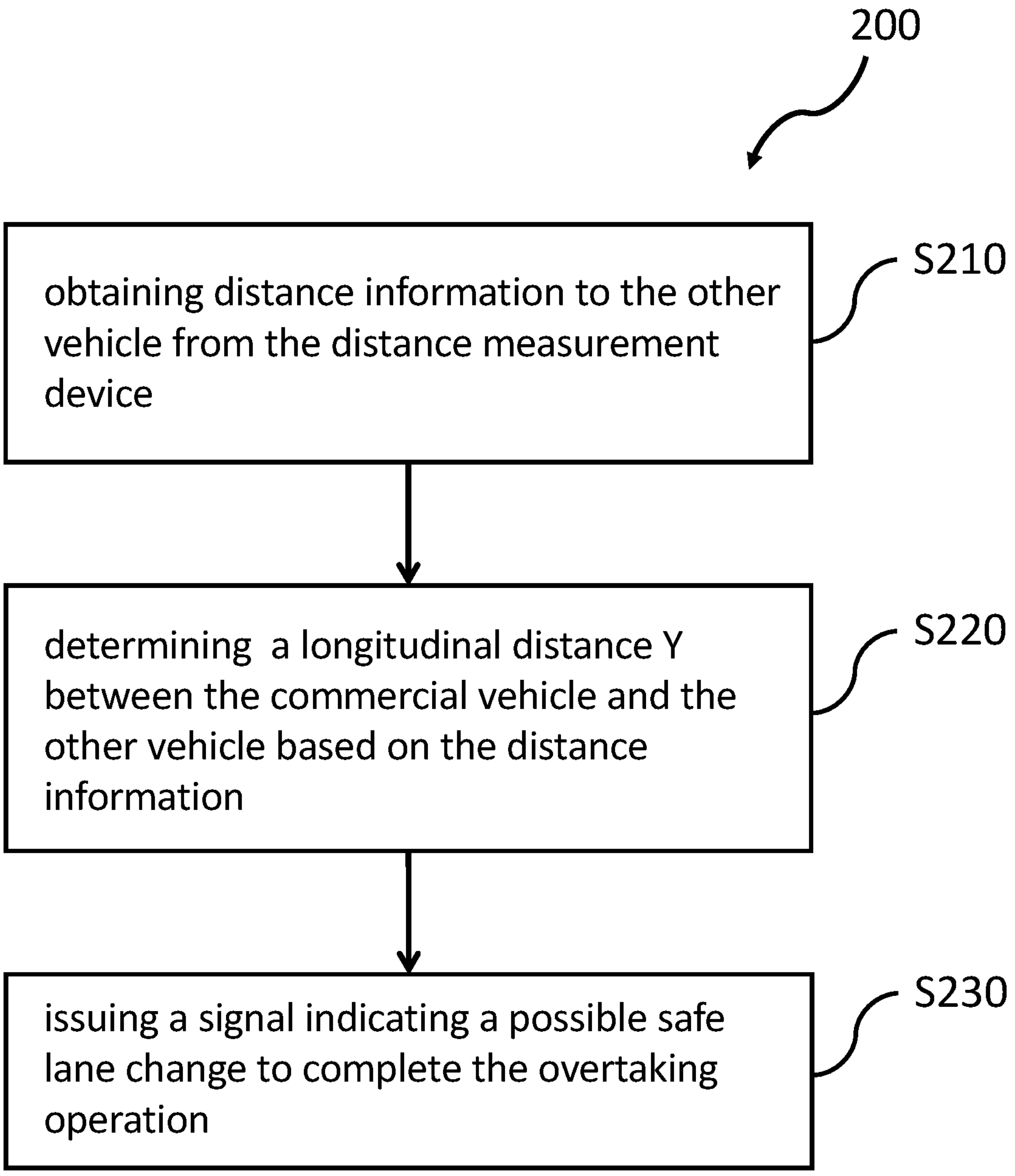
FIG. 7 depicts schematically a flow diagram of a method for assisting a commercial vehicle when overtaking another vehicle.

FIG. 7 depicts a flow diagram of a method 200, for assisting a commercial vehicle 50, when overtaking another vehicle 60. The method comprises the steps of:

obtaining S210 distance information to the other vehicle 60 from the distance measurement device 51;

determining S220 a longitudinal distance Y between the commercial vehicle 50 and the other vehicle 60 based on the distance information; and issuing S230 a signal indicating a possible safe lane change to complete the overtaking operation.

The method 200, may further comprise to determine at least one of the following: a closest distance R and an angle of the object reflection a between the commercial vehicle and the other vehicle, a lateral distance X, a relative speed and a relative acceleration between the commercial vehicle 50 and the other vehicle 60, and an activated indicator.

The method 200 may also be a computer-implemented method. A person of skill in the art would readily recognize that steps of various above-described methods may be performed by programmed computers. Embodiments are also intended to cover program storage devices, e.g., digital data storage media, which are machine or computer-readable and encode machine-executable or computer-executable programs of instructions, wherein the instructions perform some or all of the acts of the above-described methods when executed on the computer or processor.

The description and drawings merely illustrate the principles of the disclosure. It will thus be appreciated that those skilled in the art will be able to devise various arrangements that, although not explicitly described or shown herein, embody the principles of the disclosure and are included within its scope.

Furthermore, while each embodiment may stand on its own as a separate example, it is to be noted that in other embodiments the defined features can be combined differently, i.e. a particular feature described in one embodiment may also be realized in other embodiments. Such combinations are covered by the disclosure herein unless it is stated that a specific combination is not intended.

LIST OF REFERENCE SIGNS

40 CAN bus
50 commercial vehicle
51 distance measurement device(s)
52 rear side of the commercial vehicle
53 trailer
54 sensor device(s)
55 coverage area of the sensor
56 coverage area of a distance measurement device
60 another vehicle/object
65 front corner/edge of the other vehicle
70 adjacent lane
80 lane for overtaking
100 overtaking assistant device
110 evaluation unit
120 braking control unit
130 light control unit
140 vehicle electronic control unit
A width of the commercial vehicle
R closest distance
Y longitudinal distance
X lateral distance
α angle between the line of closest distance and rear side

The invention claimed is:

1. An overtaking assistance device for a commercial vehicle equipped with at least one distance measurement device, the overtaking assistance device comprising a processor configured to act as:

a driver unit configured to control an overtaking operation of the commercial vehicle; and an evaluation unit configured to provide an overtaking support function by:

accessing the distance measurement device, which is mounted on a rear of the commercial vehicle and configured to provide distance information suitable to determine a closest distance and an angle to another vehicle in an adjacent driving lane, to obtain distance information to the other vehicle;

determining a longitudinal distance between the commercial vehicle and the other vehicle based on the distance information; and issuing a signal indicating a possible safe lane change to complete the overtaking operation when the longitudinal distance is greater than a predefined threshold, wherein the evaluation unit is further configured to:

determine a lateral distance and determine a compensation for an offset of a position of the distance measurement device from a reference position, and issue a second signal to the driver unit when the determined lateral distance is outside a predefined range, wherein the evaluation unit is configured to be placed in an idle state and an activated state, and the overtaking support function is provided in the activated state which is triggered by at least one of:

an activated turning indicator, an initiated or upcoming steering actuation, a lateral approaching object, or a longitudinal approaching object; and wherein when the evaluation unit is in the activated state, the evaluation unit is configured to automatically provide the overtaking support function for the overtaking operation, and after finishing the overtaking operation, the evaluation unit is configured to automatically return to the idle state.

2. The device according to claim 1, wherein the evaluation unit is further configured to determine at least one of:

a speed relative to the other vehicle, an acceleration relative to the other vehicle, an angle of object reflections, which are each measured between the commercial vehicle and the other vehicle, or an activated indicator.

3. The device according to claim 2, wherein the evaluation unit is further configured to:

calculate, based on the relative speed, a time to collision; and issue a first signal to the a driving unit in case the time of collision is below a predefined threshold.

4. The device according to claim 1, wherein the evaluation unit is further configured to:

issue a third signal to the driving unit based on the determined longitudinal distance.

5. The device according to claim 1, wherein the evaluation unit is further configured to:

trigger one or more of:

an acoustic signal, a blinking of an end-outline marker, a visual indicator in a cabin or at the vehicle visible through a side window or a side mirror for the driver, or a warning to other systems.

6. The device according to claim 1, further comprising:

at least one sensor mounted on a side of the commercial vehicle and configured to detect the other vehicle at the side of the vehicle, wherein the evaluation unit is further configured to receive a detection signal of the sensor as a confirmation of a presence of the other vehicle.

7. An electronic control unit comprising a device according to claim 1, wherein the electronic control unit is configured to control a function of the commercial vehicle other than an overtaking assistance.

8. The ECU according to claim 7, wherein the ECU is:
a brake control unit,
a light control unit,
a vehicle electronic control unit, or
a control unit of the distance measurement device.

9. A commercial vehicle, comprising:
at least one distance measurement device; and
an overtaking assistance device according to claim 1.

10. The commercial vehicle according to claim 9, wherein the commercial vehicle includes a tractor and a trailer, and the distance measurement device is mounted on a rear side of the trailer and comprises at least one of: a Lidar, at least one Radar unit, or a stereo camera.

11. A method for assisting a commercial vehicle when overtaking another vehicle, the commercial vehicle comprising at least one distance measurement device, the method comprising, with a processor of the commercial vehicle acting as an overtaking assistance device:
controlling an overtaking operation of the commercial vehicle; and
providing an overtaking support function by:
obtaining, from the distance measurement device which is mounted on a rear side of the commercial vehicle and configured to measure a distance to another vehicle in an adjacent driving lane, distance information to the other vehicle;
determining a longitudinal distance between the commercial vehicle and the other vehicle based on the distance information; and
issuing a signal indicating a possible safe lane change to complete the overtaking operation when the longitudinal distance is greater than a predefined threshold, including the following:
determining a lateral distance,
compensating for an offset of a position of the distance measurement device from a reference position, and
issuing a second signal to the driver unit in case the determined lateral distance is outside a predefined range,
wherein the overtaking assistance device may be placed in an idle state and an activated state, and the overtaking support function is provided in the activated state which is triggered by at least one of:
an activated turning indicator,
an initiated or upcoming steering actuation,
a lateral approaching object, or
a longitudinal approaching object; and
wherein when the overtaking assistance device is in the activated state, the overtaking assistance device automatically provides the overtaking support function for the overtaking operation, and after finishing the overtaking operation, the overtaking assistance device automatically return to the idle state.

12. A computer product comprising a non-transitory computer readable storage medium having program code stored thereon which, when executed on a processor, causes the processor to perform acts of:
controlling an overtaking operation of the commercial vehicle; and
providing an overtaking support function by:
obtaining, from a distance measurement device which is mounted on a rear of the commercial vehicle and configured to provide distance information suitable to determine a closest distance and an angle to another vehicle in an adjacent driving lane, distance information from the commercial vehicle to another vehicle;
determining a longitudinal distance between the commercial vehicle equipped with the distance measuring unit and the other vehicle based on the distance information; and
issuing a signal indicating a possible safe lane change of the commercial vehicle to complete an overtaking operation of the other vehicle when the longitudinal distance is greater than a predefined threshold, including the following:
determining a lateral distance,
compensating for an offset of a position of the distance measurement device from a reference position, and
issuing a second signal to the driver unit in case the determined lateral distance is outside a predefined range,
wherein the overtaking operation is configured to be placed in an idle state and an activated state, and the overtaking support function is provided in the activated state which is triggered by at least one of:
an activated turning indicator,
an initiated or upcoming steering actuation,
a lateral approaching object, or
a longitudinal approaching object,
wherein when the overtaking operation is in the activated state, the overtaking operation is configured to automatically provide the overtaking support function for the overtaking operation, and after finishing the overtaking operation, the overtaking operation is configured to automatically return to the idle state.

13. The computer product of claim 12, wherein the program code, when executed by the processor, causes the processor to perform further acts of:
controlling vehicle braking of the commercial vehicle at least in part during the overtaking function.

14. The method of claim 11, wherein:
the processor of the commercial vehicle further acts as a brake control unit that comprises the overtaking assistance device; and
the method further comprises the brake control unit controlling vehicle braking of the commercial vehicle at least in part during the overtaking function.

15. The overtaking assistance device of claim 1, wherein:
the processor further acts as an electronic control unit of the commercial vehicle that comprises a brake control unit that comprises the overtaking assistance device; and
the brake control unit is configured to control vehicle braking of the commercial vehicle at least in part during the overtaking function.

* * * * *